United States Patent
Tamano

(10) Patent No.: US 7,069,505 B2
(45) Date of Patent: Jun. 27, 2006

(54) DOCUMENT MANAGEMENT SYSTEM, METHOD THEREOF, AND PROGRAM THEREOF

(75) Inventor: Ryuichi Tamano, Tokyo (JP)

(73) Assignee: NEC Corporation, Tokyo (JP)

( * ) Notice: Subject to any disclaimer, the term of this patent is extended or adjusted under 35 U.S.C. 154(b) by 548 days.

(21) Appl. No.: 10/291,711

(22) Filed: Nov. 12, 2002

(65) Prior Publication Data

US 2003/0097638 A1  May 22, 2003

(30) Foreign Application Priority Data

Nov. 21, 2001 (JP) ............................. 2001-356585

(51) Int. Cl.
*G06F 15/00* (2006.01)

(52) U.S. Cl. .......................................... 715/514; 707/3

(58) Field of Classification Search ............. 715/501.1, 715/514, 500, 513; 707/3, 6
See application file for complete search history.

(56) References Cited

U.S. PATENT DOCUMENTS

| | | | |
|---|---|---|---|
| 6,360,215 B1* | 3/2002 | Judd et al. ....................... | 707/3 |
| 6,582,474 B1* | 6/2003 | LaMarca et al. ............. | 715/500 |
| 6,684,204 B1* | 1/2004 | Lal ................................ | 707/3 |
| 6,738,767 B1* | 5/2004 | Chung et al. ................... | 707/7 |
| 6,886,005 B1* | 4/2005 | Davis ............................ | 707/2 |
| 2001/0039553 A1* | 11/2001 | LaMarca et al. .......... | 707/501.1 |
| 2001/0051899 A1* | 12/2001 | Kawashima et al. .......... | 705/26 |
| 2002/0059281 A1* | 5/2002 | Watanabe et al. ........... | 707/100 |
| 2002/0099792 A1* | 7/2002 | Brandin et al. .............. | 709/218 |
| 2002/0107847 A1* | 8/2002 | Johnson ......................... | 707/3 |
| 2002/0147747 A1* | 10/2002 | Zaharkin ..................... | 707/513 |
| 2003/0033315 A1* | 2/2003 | Winkler ....................... | 707/100 |
| 2003/0120671 A1* | 6/2003 | Kim et al. ................... | 707/100 |
| 2003/0237051 A1* | 12/2003 | LaMarca et al. ............ | 715/513 |
| 2005/0022115 A1* | 1/2005 | Baumgartner et al. ...... | 715/513 |

FOREIGN PATENT DOCUMENTS

| | | |
|---|---|---|
| JP | 4-57153 | 2/1992 |
| JP | 10-11469 | 1/1998 |
| JP | 10-187680 | 7/1998 |
| JP | 10-240752 | 9/1998 |
| JP | 2000-348038 | 12/2000 |
| JP | 2001-5820 | 1/2001 |

\* cited by examiner

*Primary Examiner*—Cong-Lac Huynh
(74) *Attorney, Agent, or Firm*—Young & Thompson

(57) ABSTRACT

A document storing portion registers document data input from a document inputting unit to a document storing portion. A document search index creating portion analyzes the content of newly registered document data, creates a document search index that allows the document data to be searched for based on each tag, and stores the document search index to a document search index storing portion. A categorizing map creating portion refers to a categorizing map defined in a categorizing map storing portion, causes a document searching portion to search the document search index storing portion, creates leaves of the categorizing map, and creates a categorizing map for the newly registered document data. When the categorizing map is displayed, since only necessary leaves are displayed, the visibility and operability of the system are improved.

18 Claims, 4 Drawing Sheets

DOCUMENT MANAGEMENT SYSTEM, METHOD THEREOF, AND PROGRAM THEREOF

BACKGROUND OF THE INVENTION

1. Field of the Invention

The present invention relates to a document management system, a management method thereof, and a program thereof, and in particular, to those for managing tagged document data corresponding to a categorizing map.

2. Description of the Related Art

In a conventional document management system, as a method for categorizing and searching for document data, a categorizing map having a hierarchical structure is created. A search condition is assigned to each terminal leaf, which is a terminal of the hierarchical structure of the categorizing map. When the user selects a certain terminal leaf, a list showing a set of documents which matches the search condition assigned to the certain terminal leaf is displayed on a display unit.

However, the conventional document management system has the following disadvantages.

As a first disadvantage, since a categorizing map having a hierarchical structure is fixed, values and search conditions of all leaves must be defined in advance. Thus, there are too many unnecessary leaves. When a categorizing map is displayed on the displaying unit, there are too many items which are displayed. Thus, the operationality and visibility of the system are insufficient.

As a second disadvantage, since a categorizing map having a hierarchical structure is fixed, whenever a value which is not contained in the categorizing map appears in a document, the categorizing map must be changed. As a result, the maintainability of the system is insufficient.

SUMMARY OF THE INVENTION

The present invention is made from the above point of view. An object of the present invention is to provide a document management system for managing tagged document data, and in particular, a document management system, a management method thereof, and a program thereof for automatically creating a categorizing map for categorizing document data so as to manage document data using the categorizing map and search for document data using the categorizing map.

According to a first aspect of the present invention, there is provided a document management system for managing tagged document data corresponding to a categorizing map, comprising: an inputting unit for inputting the tagged document data; a storing unit for storing document data which has been input by the inputting unit; a data processing unit for executing a data process under the control of a program; and a displaying unit for displaying document data stored in the storing unit, wherein the data processing unit comprises: document registering means for registering tagged document data, which has been input by the inputting unit, with the storing unit; document search index creating means for analyzing the document data registered by the document registering means and creating a search index which allows the document data to be searched for based on each tag; and categorizing map creating means for creating a categorizing map having leaves having tagged contents of document data whenever a predetermined amount of document data is registered with the storing unit by the document registering means.

In the document management system, the storing unit may comprise: a document data storing portion for storing the tagged document data registered by the document registering means; a search index storing portion for storing a search index created by the document search index creating means; and a categorizing map storing portion for storing a categorizing map created by the categorizing map creating means.

In the document management system, the categorizing map may comprise a plurality of nodes which are tree-structured, a node having a leaf may be assigned an development condition for developing the leaf, and the leaf may be assigned a search condition.

In the document management system, when a tag path is assigned as the development condition to an initial document set registered with the storing unit by the document registering means, the categorizing map creating means may be operated: to select a first document from the initial document set and obtain a value of a tag path of the selected document; to extract a document set which does not contain the value of the tag path of the selected document from the initial document set; to treat the extracted document set as a new initial document set, select a first document from the new initial document set, and obtain the value of the tag path of the selected document; to extract a document set which does not contain the obtained tag path from the new initial document set; and to continue the process until the initial document set becomes null.

In the document management system, the data processing unit may be operated: to cause the document search index creating means to create an added document search index whenever the amount of newly added document data registered with the storing unit by the document registering means reaches a predetermined value; and to cause the categorizing map creating means to create a difference categorizing map for the added document data, and the storing unit may comprise: an added document search index storing portion for storing the added document search index created by the document search index creating means; and a difference categorizing map storing portion for storing the difference categorizing map created by the categorizing map creating means, and the data processing unit may comprise: categorizing map merging means for merging a categorizing map stored in the categorizing map storing portion and a difference categorizing map stored in the difference categorizing map storing portion so as to create a new categorizing map, and whenever a predetermined amount of the added document data is registered, the categorizing map stored in the categorizing map storing portion may be updated with the new categorizing map created by the categorizing map merging means.

In the document management system, the data processing unit may comprise: document searching means for searching desired document data corresponding to a categorizing map stored in the categorizing map storing portion.

According to a second aspect of the present invention, there is provided a document managing system comprising: means for selecting a first document from an initial document set and obtain a value of a tag path of the selected document; means for extracting a document set which does not contain the value of the tag path of the selected document from the initial document set; means for treating the extracted document set as a new initial document set, selecting a first document from the new initial document set, and obtaining the value of the tag path of the selected document; means for extracting a document set which does not contain the obtained tag path from the new initial document set; and means for continuing the process until the initial document set becomes null.

These and other objects, features and advantages of the present invention will become more apparent in light of the following detailed description of the best mode embodiment thereof, as illustrated in the accompanying drawings.

DESCRIPTION OF PREFERRED EMBODIMENTS

Next, with reference to the accompanying drawings, document management systems, management method thereof, and programs thereof according to embodiments of the present invention will be described. FIGS. 1 to 4 show document management systems, management methods thereof, programs thereof according to the embodiments of the present invention.

(First Embodiment)

Figure 1:
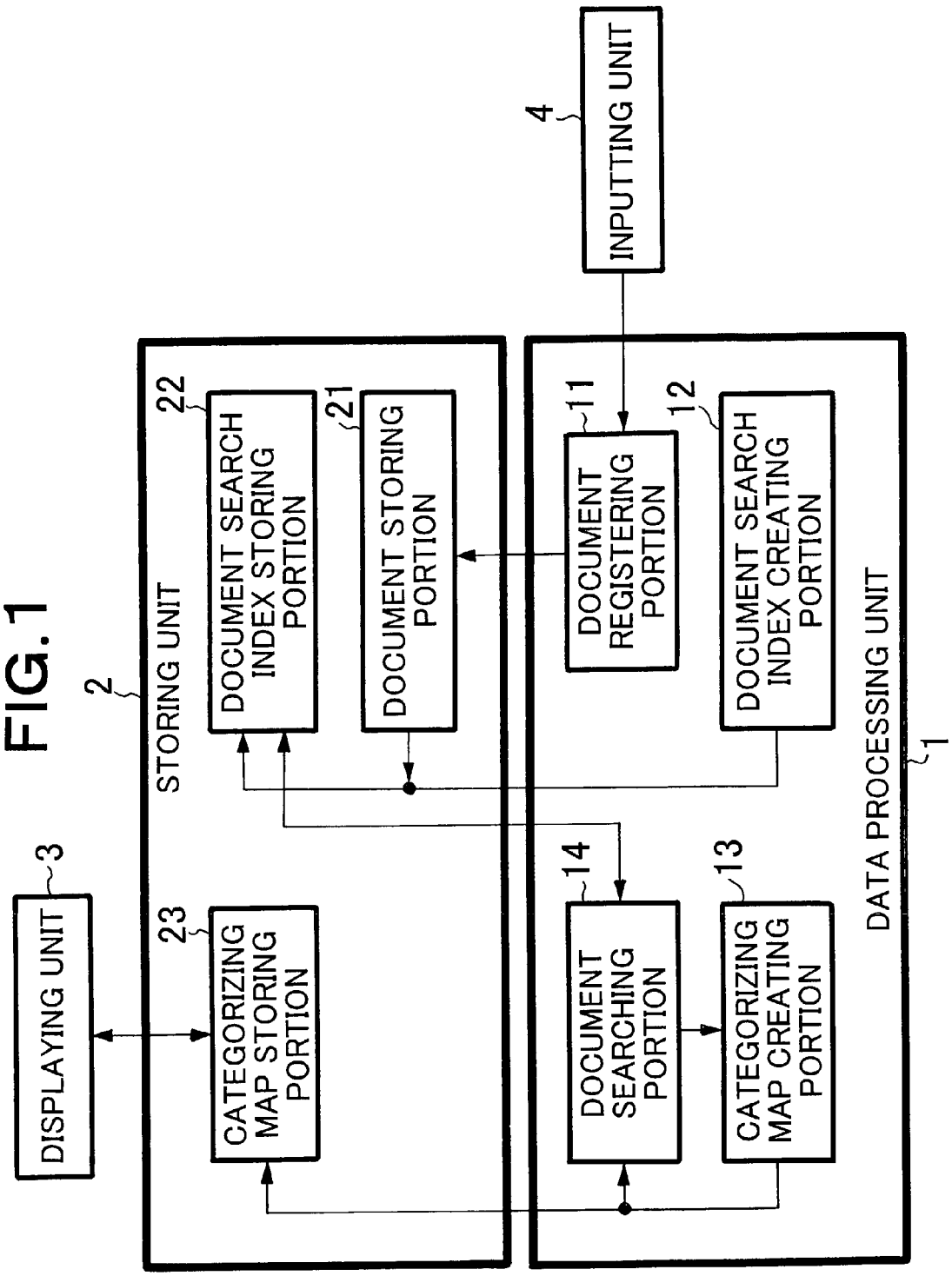
FIG. 1 is a block diagram showing an outlined structure of a document data management system according to a first embodiment of the present invention.

FIG. 1 is a block diagram showing an outlined structure of a document management system according to a first embodiment of the present invention. In FIG. 1, the document management system according to the first embodiment of the present invention comprises a data processing unit 1, a storing unit 2, a displaying unit 3, and an inputting unit 4. The data processing unit 1 is operated under the control of a program. The storing unit 2 stores information such as document data. The displaying unit 3 is a CRT (Cathode Ray Tube), an LCD (Liquid Crystal Diode), a PDP (Plasma Display Panel), or the like which displays document data and so forth. The inputting unit 4 inputs document data and so forth to the data processing unit 1.

The data processing unit 1 comprises a document registering portion 11, a document search index creating portion 12, a categorizing map creating portion 13, and a document searching portion 14.

The storing unit 2 comprises a document storing portion 21, a document search index storing portion 22, and a categorizing map storing portion 23. The document storing portion 21 stores document data which is received from the document registering portion 11. The document search index storing portion 22 stores a document search index created by the document search index creating portion 12. The categorizing map storing portion 23 stores the categorizing map created by the categorizing map creating portion 13.

The document registering portion 11 sends document data which has been input by the inputting unit 4 to the document storing portion 21. Each piece of document data registered with the document storing portion 21 is tagged. In each tag, the content of each piece of document data is described.

When each piece of document data which has been input to the document storing portion 21 is registered with the document registering portion 11, the document search index creating portion 12 analyzes the content of each piece of document data, creates a document search index which allows a tagged value of each piece of document data to be searched for, and sends the created document search index to the document search index storing portion 22 of the storing unit 2.

When the document registering portion 11 has registered a predetermined amount of document data to the document storing portion 21, the categorizing map creating portion 13 creates a categorizing map having leaves which contain tagged contents using the predetermined amount of document data and sends the created categorizing map to the categorizing map storing portion 23.

The document searching portion 14 searches the document search index storing portion for a document search index which matches the search condition assigned to a leaf which is arbitrarily selected by a user, and searches the document storing portion for a document which corresponds to the document search index to display the document on the display unit 3.

Next, an example of an operation in which tagged document data is registered with the document management system according to the first embodiment of the present invention will be described.

The document registration portion 11 registers document data which has been input from the inputting unit 4 to the document storing portion 21. Thereafter, the document search index creating portion 12 analyzes the content of document data which has been newly registered, creates a document search index which allows the document data to be searched for based on each tag, and stores the document search index to the document search index storing portion 22. The categorizing map creating portion 13 refers to definitions of the categorizing map stored in the categorizing map storing portion 23. The document searching portion 14 searches for the document search index storing portion 22 and creates each leaf of the categorizing map so as to create a categorizing map for the newly registered document data.

Figure 2:
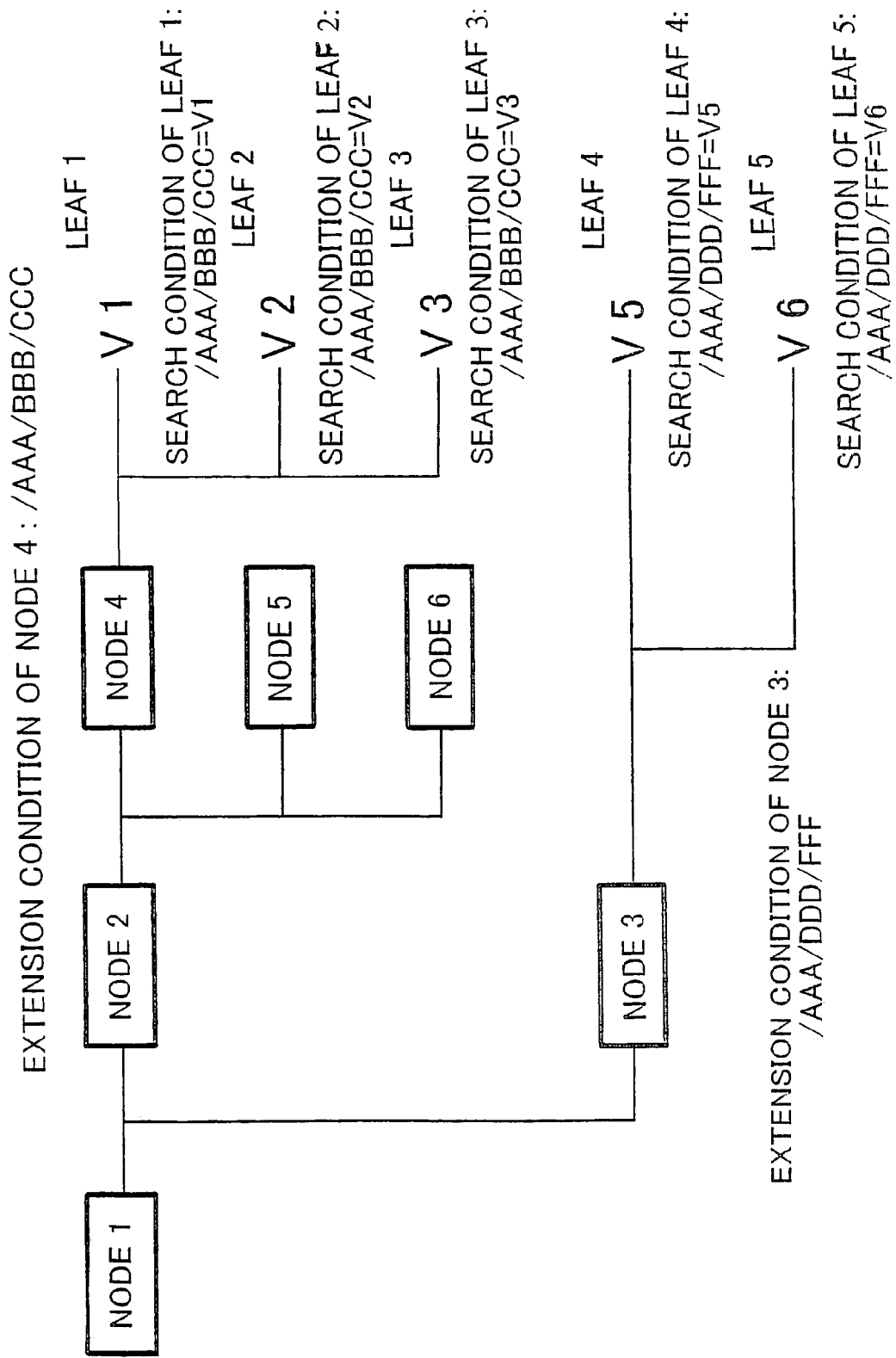
FIG. 2 is a schematic diagram showing an example of a distribution map according to the first embodiment of the present invention.

FIG. 2 shows an example of a categorizing map created by the categorizing map creating portion 13.

As shown in FIG. 2, a categorizing map is defined in a tree structure. Each node which has a leaf describes an development condition for developing a leaf. For example, when a tag path /AAA/BBB/CCC has been designated as an development condition of node 4, values (V1, V2, and V3) described in the tag path /AAA/BBB/CCC of each piece of document data registered in the document storing portion 21 are displayed as values of leaves (1 to 3) which belong to node 4.

According to the present invention, a list of values of leaves of the categorizing map is automatically created. Corresponding to the created categorizing map, document data can be easily managed and searched for.

For example, the node 4 holds an development condition of /AAA/BBB/CCC, leaf V1 under the node 4 holds a search condition of /AAA/BBB/CCC=V1, leaf V2 under the node 4 holds a search condition of /AAA/BBB/CCC=V2 and leaf V3 under the node 4 holds a search condition of /AAA/BBB/CCC=V3. If the node 4 is selected on a first region of a display, then the leafs V1, V2 and V3 are displayed on a second region of the display together with the search conditions of /AAA/BBB/CCC=V1, /AAA/BBB/CCC=V2 and /AAA/BBB/CCC=V3. If the leaf V1 is selected on the second region of the display, then a list of documents which include a tag of <AAA><BBB><CCC>V1<¥CCC><¥BBB><¥AAA> is displayed on a third region of the display. If one document in the list is selected, then the content of the document is displayed.

Figure 3:
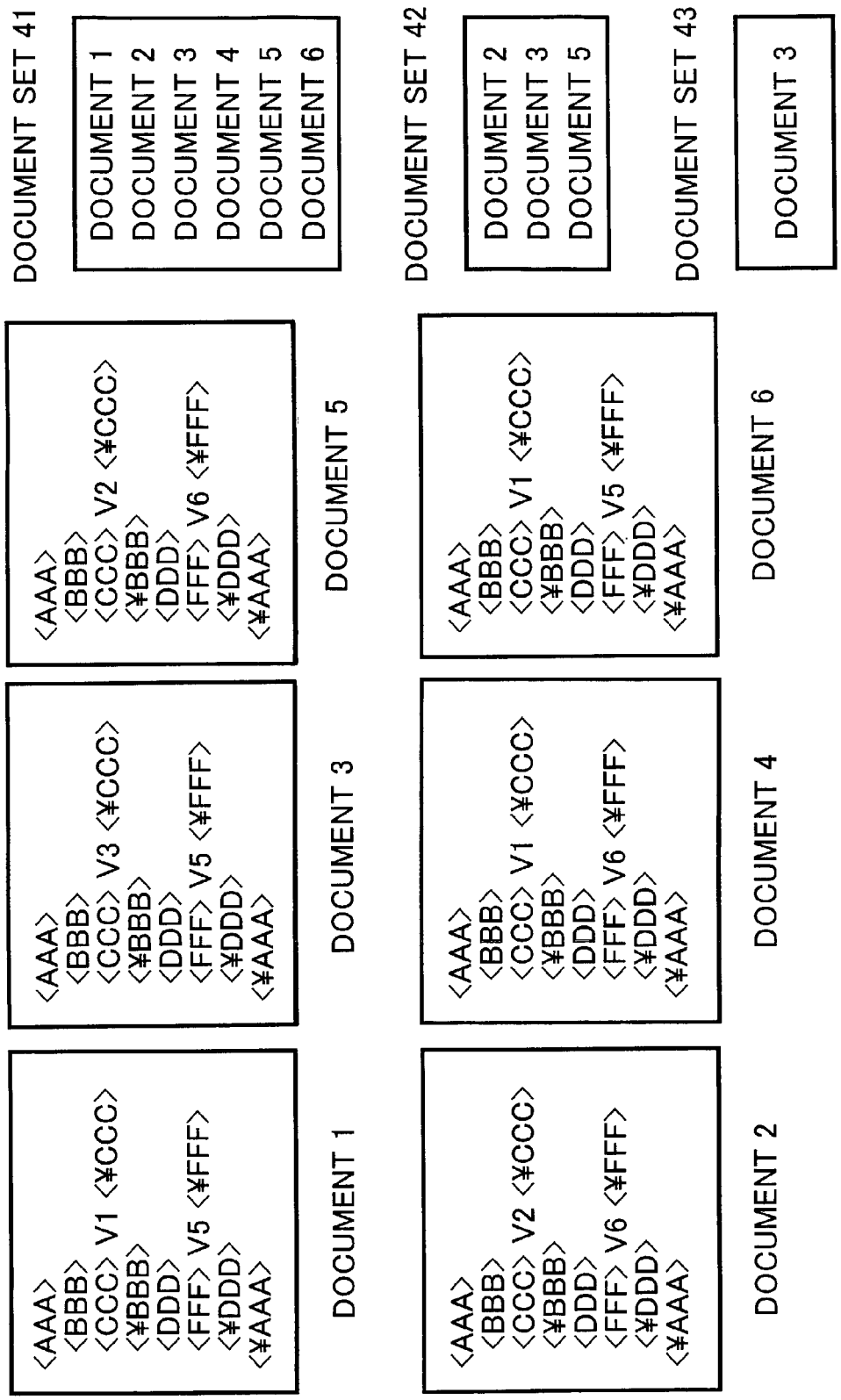
FIG. 3 is a schematic diagram showing a method for creating a leaf table.

FIG. 3 shows a method for creating a list of leaves. Document 1 is selected as a first document from six documents 1 to 6 shown in FIG. 3. A value of a tag path /AAA/BBB/CCC is obtained. In this case, since document 1 has been selected, V1 is obtained. Corresponding to the value V1, leaf 1 with a search condition of /AAA/BBB/CCC=V1 is created.

Thereafter, all the documents which do not include a tag of <AAA><BBB><CCC>V1<¥CCC><¥BBB><¥AAA> is searched for from a document group 41 using the document search index stored in the document search index storing portion 22. In the case shown in FIG. 3, the documents 2, 3 and 5 are searched for and constitute a document group 42.

Thereafter, the document 2 is selected as a first document in the document group 42, and a value of V2 in the tag path /AAA/BBB/CCC is obtained.

Thereafter, all the documents which do not include a tag of <AAA><BBB><CCC>V2<¥CCC><¥BBB><¥AAA> is searched for from the document group 42 using the document search index stored in the document search index storing portion 22. In the case shown in FIG. 3, the document 3 is searched for and constitutes a document group 43.

Thereafter, the document 3 is selected as a first document in the document group 43, and a value of V3 in the tag path /AAA/BBB/CCC is obtained.

Thereafter, all the documents which do not include a tag of <AAA><BBB><CCC>V3<¥CCC><¥BBB><¥AAA>is searched for from the document group 43 using the document search index stored in the document search index storing portion 22. In the case shown in FIG. 3, no document is searched for and the process completes.

Hence, the leaf V1 which has a search condition of /AAA/BBB/CCC=V1, the leaf V2 which has a search condition of /AAA/BBB/CCC=V2 and the leaf V3 which has a search condition of /AAA/BBB/CCC=V3 are obtained. The documents, i.e., the documents 1, 4 and 6, which are included in the document group 41 and are not included in the document group 42 fall under the leaf V1. In other words, the documents, i.e., the documents 1, 4 and 6, which has a tag of <AAA><BBB><CCC>V1<¥AAA><¥BBB><¥CCC> fall under the leaf V1. The documents, i.e., the documents 2 and 5, which are included in the document group 44 and are not included in the document group 43 fall under the leaf V2. In other words, the documents, i.e., the documents 2 and 5, which has a tag of <AAA><BBB><CCC>V2<¥AAA><¥BBB><¥CCC> fall under the leaf V2. The document 3, i.e., the document 3, which is included in the document group 43 and are not included in a null document group fall under the leaf V3. In other words, the document, i.e., the document 3, which has a tag of <AAA><BBB><CCC>V3<¥AAA><¥BBB><¥CCC> fall under the leaf V3.

(Second Embodiment)

Figure 4:
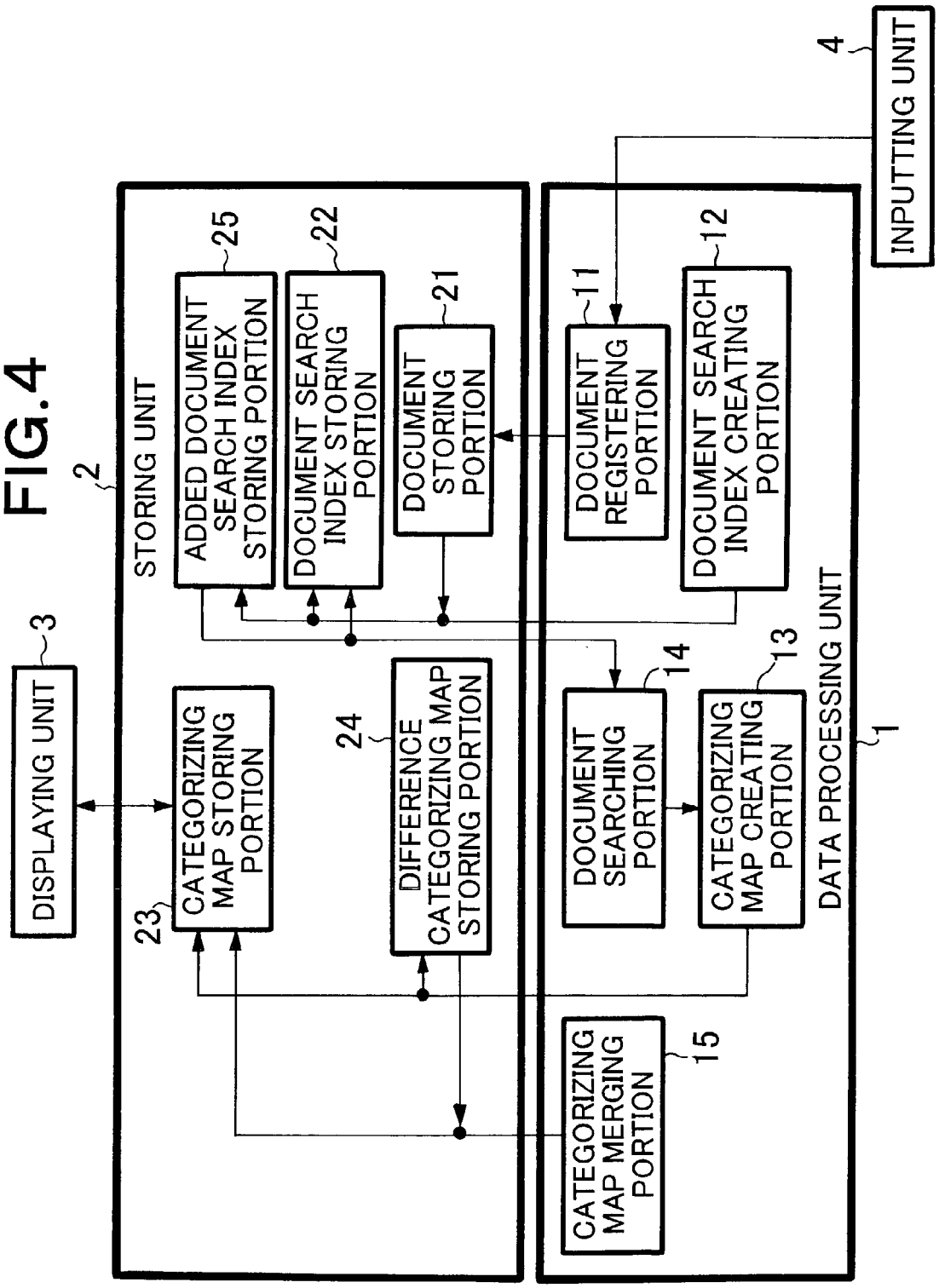
FIG. 4 is a block diagram showing an outlined structure of a document data management system according to a second embodiment of the present invention.

FIG. 4 is a block diagram showing an outlined structure of a document management system according to a second embodiment of the present invention. The structure of the document management system (shown in FIG. 4) according to the second embodiment of the present invention is different from the structure of the document management system (shown in FIG. 1) according to the first embodiment of the present invention in a categorizing map merging portion 15 which is added to the former structure and in a difference categorizing map storing portion 24 and an added document search index storing portion 25 which are added to the storing unit 2 of the former structure. For simplicity, in FIG. 4, similar structural elements to those in FIG. 1 will be denoted by similar reference numerals and their description will be omitted.

The categorization map merging portion 15 merges a categorizing map (difference categorizing map created for newly added document data and a categorizing map stored in a categorization map storing portion 23.

The difference categorizing map storing portion 24 stores a difference categorizing map created for the newly added document data.

The added document search index storing portion 25 stores an added document search index created for the newly added document data.

Next, an example of an operation in which tagged document data is registered with a document management system according to the second embodiment will be described.

The document registering portion 11 registers newly added document data which has been input from the inputting unit 4 to the document storing portion 21. Thereafter, the document search index creating portion 12 analyzes the content of the newly added document data, creates an added document search index which allows the newly added document data to be searched for based on each tag, and stores the added document search index to the added document search index storing portion 25. When the amount of the added document data exceeds a predetermined value, the categorizing map creating portion 13 is operated. The categorizing map creating portion 13 searches the added document search index storing portion 25 which stores the search index for the added document data, creates a difference categorizing map, and stores the difference categorizing map to the difference categorizing map storing portion 24. In this example, after the categorizing map creating portion 13 has created the difference categorizing map, the index information stored in the added document search index storing portion 25 is deleted.

Thereafter, the categorizing map merging portion 15 is operated. The categorizing map merging portion 15 merges the difference categorizing map stored in the difference categorizing map storing portion 24 and the categorizing map stored in the categorization map storing portion 23. The categorizing map merging portion 15 searches tree structured nodes from the root nodes of the categorizing map stored in the categorization map storing portion 23 and the difference categorizing map stored in the difference categorizing map storing portion 24. After creating a list of leaves, the categorization map merging portion 15 adds only leaves which are contained in the difference categorizing map, not in the categorizing map. The categorizing map merging portion 15 performs this operation for all nodes and all leaves so as to automatically update the categorizing map.

Thus, even if the number of registered documents becomes large, a difference categorizing map is created with only added documents. The categorizing map merging portion 15 merges the created difference categorizing map and the categorizing map stored in the categorization map storing portion 23. As a result, the categorizing map is automatically updated. Thus, the categorizing map can be created without a sacrifice of the performance of the system.

As is clear from the forgoing description, according to the present invention, since leaves for creating a categorizing map are automatically created with contents of documents, unnecessary leaves are not created. Thus, the storage capacity for the categorizing map can be reduced. In addition, when a categorizing map is displayed, since only necessary leaves are displayed, the visibility and operationality of the system can be improved.

In addition, according to the present invention, when a document is added, since a leaf is automatically created with the content of the document, it is not necessary to manually modify the categorizing map. In addition, since the performance of the system is not deteriorated, the maintainability thereof can be improved.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A document management system for managing tagged document data corresponding to a categorizing map, comprising:
    an inputting unit for inputting the tagged document data;
    a storing unit for storing document data which has been input by the inputting unit;
    a data processing unit for executing a data process under the control of a program; and
    a displaying unit for displaying document data stored in the storing unit,
    wherein the data processing unit comprises:
    document registering means for registering tagged document data, which has been input by the inputting unit, with the storing unit;
    document search index creating means for analyzing the document data registered by the document registering means and creating a search index which allows the document data to be searched for based on each tag;
    categorizing map creating means for creating a categorizing map having leaves having tagged contents of document data whenever a predetermined amount of document data is registered with the storing unit by the document registering means,
    wherein when a tag path is assigned as the development condition to an initial document set registered with the storing unit by the document registering means, the categorizing map creating means is operated:
    to select a first document from the initial document set and obtain a value of a tag path of the selected document;
    to extract a document set which does not contain the value of the tag path of the selected document from the initial document set;
    to treat the extracted document set as a new initial document set, select a first document from the new initial document set, and obtain the value of the tag path of the selected document;
    to extract a document set which does not contain the obtained tag path from the new initial document set; and
    to continue the process until the initial document set becomes null.

2. The document management system as set forth in claim 1,
    wherein the storing unit comprises:
    a document data storing portion for storing the tagged document data registered by the document registering means;
    a search index storing portion for storing a search index created by the document search index creating means; and
    a categorizing map storing portion for storing a categorizing map created by the categorizing map creating means.

3. The document management system as set forth in claim 2,
    wherein the data processing unit comprises:
    document searching means for searching desired document data corresponding to a categorizing map stored in the categorizing map storing portion.

4. The document management system as set forth in claim 1,
    wherein the categorizing map comprises a plurality of nodes which are tree-structured,
    wherein a node having a leaf is assigned an development condition for developing the leaf, and
    wherein the leaf is assigned a search condition.

5. The document management system as set forth in claim 1,
    wherein the data processing unit is operated:
    to cause the document search index creating means to create an added document search index whenever the amount of newly added document data registered with the storing unit by the document registering means reaches a predetermined value; and
    to cause the categorizing map creating means to create a difference categorizing map for the added document data,
    wherein the storing unit comprises:
    an added document search index storing portion for storing the added document search index created by the document search index creating means; and
    a difference categorizing map storing portion for storing the difference categorizing map created by the categorizing map creating means,
    wherein the data processing unit comprises:
    categorizing map merging means for merging a categorizing map stored in the categorizing map storing portion and a difference categorizing map stored in the difference categorizing map storing portion so as to create a new categorizing map, and
    wherein whenever a predetermined amount of the added document data is registered, the categorizing map stored in the categorizing map storing portion is updated with the new categorizing map created by the categorizing map merging means.

6. A management method for a document management system having:
    an inputting unit for inputting tagged document data;
    a storing unit for storing document data which has been input by the inputting unit;
    a data processing unit for executing a data process under the control of a program; and
    a displaying unit for displaying document data stored in the storing unit,
    wherein the management method comprises the steps of:
    registering tagged document data, which has been input by the inputting unit, to the storing unit;
    analyzing the document data registered at the document registering step and creating a search index which allows the document data to be searched for based on each tag;
    creating a categorizing map having leaves having tagged contents of document data whenever a predetermined amount of document data is registered with the storing unit at the document registering step, the document registering step, the document search index creating step, and the categorizing map creating step being performed by the data processing unit, wherein when a tag path is assigned as the development condition to an initial document set registered with the storing unit at the document registering step, the categorizing map creating step is performed by:

selecting a first document from an initial document set and obtaining a value of a tag path of the selected document;

extracting a document set which does not contain the value of the tag path of the selected document from the initial document set;

treating the extracted document set as a new initial document set, selecting a first document from the new initial document set, and obtaining the value of the tag path of the selected document;

extracting a document set which does not contain the obtained tag path from the new initial document set; and continuing the process until the initial document set becomes null.

7. The management method for the document management system as set forth in claim 6, wherein the storing unit comprises:

a document data storing portion for storing the tagged document data registered at the document registering step;

a search index storing portion for storing a search index created at the document search index creating step; and a categorizing map storing portion for storing a categorizing map created at the categorizing map creating step.

8. The management method for the document management system as set forth in claim 7, further comprising the step of:

searching desired document data corresponding to a categorizing map stored in the categorizing map storing portion, the document searching step being performed by the data processing unit.

9. The management method for the document management system as set forth in claim 6, wherein the categorizing map comprises a plurality of nodes which are tree-structured, wherein a node having a leaf is assigned an development condition for developing the leaf, and wherein the leaf is assigned a search condition.

10. The management method for the document management system as set forth in claim 6, wherein the storing unit comprises:

an added document search index storing portion for storing the added document search index created at the document search index creating step; and a difference categorizing map storing portion for storing the difference categorizing map created at the categorizing map creating step, and wherein the management method further comprises the steps of:

causing the document search index creating step to create an added document search index whenever the amount of newly added document data registered with the storing unit at the document registering step reaches a predetermined value;

creating a difference categorizing map for the added document data, the added document search index creating step and the difference categorizing map creating step being performed by the data processing unit;

merging a categorizing map stored in the categorizing map storing portion and a difference categorizing map stored in the difference categorizing map storing portion so as to create a new categorizing map; and updating the categorizing map stored in the categorizing map storing portion with the new categorizing map created at the categorizing map merging step whenever a predetermined amount of the added document data is registered, the categorizing map merging step and the categorizing map updating step being performed by the data processing unit.

11. A computer program product for a document management system having:

an inputting unit for inputting tagged document data;

a storing unit for storing document data which has been input by the inputting unit;

a data processing unit for executing a data process under the control of the computer program product; and a displaying unit for displaying document data stored in the storing unit, said computer program product being embodied on a computer-readable medium and comprising codes that, when executed, cause a computer to perform the steps of:

registering tagged document data, which has been input by the inputting unit, to the storing unit;

analyzing the document data registered by the document registering process and creating a search index which allows the document data to be searched for each tag;

creating a categorizing map having leaves having tagged contents of document data whenever a predetermined amount of document data is registered to the storing unit by the document registering process, wherein when a tag path is assigned as the development condition to an initial document set registered with the storing unit by the document registering process, the categorizing map creating process is performed by:

selecting a first document from an initial document set and obtaining a value of a tag path of the selected document;

extracting a document set which does not contain the value of the tag path of the selected document from the initial document set;

treating the extracted document set as a new initial document set, selecting a first document from the new initial document set, and obtaining the value of the tag path of the selected document;

extracting a document set which does not contain the obtained tag path from the new initial document set; and continuing the process until the initial document set becomes null.

12. The computer program product as set forth in claim 11, wherein the storing unit comprises:

a document data storing portion for storing the tagged document data registered by the document registering process;

a search index storing portion for storing a search index created by the document search index creating process; and a categorizing map storing portion for storing a categorizing map created by the categorizing map creating process.

13. The computer program product for the document management system as set forth in claim 12, wherein the codes causes the data processing unit to perform the process of:

searching desired document data corresponding to a categorizing map stored in the categorizing map storing portion.

14. The computer program product for the document management system as set forth in claim 11, wherein the categorizing map comprises a plurality of nodes which are tree-structured, wherein a node having a leaf is assigned an development condition for developing the leaf, and wherein the leaf is assigned a search condition.

15. The computer program product for the document management system as set forth in claim 11, wherein the codes causes the data processing unit to perform the processes of:

causing the document search index creating process to create an added document search index whenever the amount of newly added document data registered with the storing unit by the document registering process reaches a predetermined value; and creating a difference categorizing map for the added document data, wherein the storing unit comprises:

an added document search index storing portion for storing the added document search index created by the document search index creating process; and a difference categorizing map storing portion for storing the difference categorizing map created by the categorizing map creating process, and wherein the codes causes the data processing unit to perform the processes of:

merging a categorizing map stored in the categorizing map storing portion and a difference categorizing map stored in the difference categorizing map storing portion so as to create a new categorizing map; and updating the categorizing map stored in the categorizing map storing portion with the new categorizing map created by the categorizing map merging process whenever a predetermined amount of the added document data is registered.

16. A document managing system comprising:

means for selecting a first document from an initial document set and obtain a value of a tag path of the selected document;

means for extracting a document set which does not contain the value of the tag path of the selected document from the initial document set;

means for treating the extracted document set as a new initial document set, selecting a first document from the new initial document set, and obtaining the value of the tag path of the selected document;

means for extracting a document set which does not contain the obtained tag path from the new initial document set; and means for continuing the process until the initial document set becomes null.

17. A document managing method comprising the steps of:

selecting a first document from an initial document set and obtain a value of a tag path of the selected document;

extracting a document set which does not contain the value of the tag path of the selected document from the initial document set;

treating the extracted document set as a new initial document set, selecting a first document from the new initial document set, and obtaining the value of the tag path of the selected document;

extracting a document set which does not contain the obtained tag path from the new initial document set; and continuing the process until the initial document set becomes null.

18. A computer program product embodied on a computer-readable medium and comprising codes that, when executed, cause a computer to perform a document managing method comprising the steps of:

selecting a first document from an initial document set and obtain a value of a tag path of the selected document;

extracting a document set which does not contain the value of the tag path of the selected document from the initial document set;

treating the extracted document set as a new initial document set, selecting a first document from the new initial document set, and obtaining the value of the tag path of the selected document;

extracting a document set which does not contain the obtained tag path from the new initial document set; and continuing the process until the initial document set becomes null.

* * * * *